(12) United States Patent
Mahapatra et al.

(10) Patent No.: US 10,019,272 B1
(45) Date of Patent: Jul. 10, 2018

(54) VIRTUAL APPLIANCE MANAGER

(71) Applicant: VCE Company, LLC, Richardson, TX (US)

(72) Inventors: Akshaya Mahapatra, Richardson, TX (US); Zunhe Jin, Richardson, TX (US); Lade Gaurang, Richardson, TX (US); Sayajirao Patil, Richardson, TX (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 119 days.

(21) Appl. No.: 14/078,300

(22) Filed: Nov. 12, 2013

(51) Int. Cl.
*G06F 9/455* (2018.01)

(52) U.S. Cl.
CPC .............. *G06F 9/45533* (2013.01)

(58) Field of Classification Search
None
See application file for complete search history.

(56) References Cited

U.S. PATENT DOCUMENTS

| | | | |
|---|---|---|---|
| 2009/0300149 A1* | 12/2009 | Ferris et al. | 709/222 |
| 2009/0300641 A1* | 12/2009 | Friedman et al. | 718/104 |
| 2010/0223609 A1* | 9/2010 | DeHaan | H04L 67/16 717/177 |
| 2010/0332617 A1* | 12/2010 | Goodwin et al. | 709/219 |
| 2011/0004676 A1* | 1/2011 | Kawato | 709/221 |
| 2014/0157260 A1* | 6/2014 | Balani | G06F 9/45533 718/1 |

* cited by examiner

*Primary Examiner* — Emerson Puente
*Assistant Examiner* — Steven Do
(74) *Attorney, Agent, or Firm* — Womble Bond Dickinson (US) LLP

(57) ABSTRACT

A method, system and computer readable media for managing virtual appliances are provided. The method includes discovering each of a plurality of components of an enterprise solution, the enterprise solution encompassing a plurality of virtual appliances and relationships among the plurality of virtual appliances. Each of the plurality of virtual appliances has one or more virtual machines, and the plurality of virtual appliances are implemented in a physical computing environment. The method includes reconfiguring the plurality of components in response to a change in a configuration of one or more of the plurality of components.

20 Claims, 5 Drawing Sheets

VIRTUAL APPLIANCE MANAGER

BACKGROUND

When a virtual appliance is deployed into a virtual computing environment, which in turn is implemented in a physical computing environment, the virtual appliance is configured according to available resources. When multiple virtual appliances are deployed, it may be difficult to determine which of the appliances are dependent on each other. If a configuration of any of the components of any of the virtual appliances is changed, this may break the entire setup. It is often difficult to isolate a component, or a change in a component, that is the cause of the failure. For example, if a host name or an Internet Protocol address of a virtual appliance database is changed, then the virtual appliance will stop functioning, as the virtual appliance is dependent on the location of the database. These kinds of changes can occur, for example, when a virtual machine is moved to a different physical computer, or the Internet Protocol address of a host server is changed. Manual debugging under such circumstances is difficult and time-consuming.

SUMMARY

In some embodiments, a method for managing virtual appliances is provided. The method includes discovering each of a plurality of components of an enterprise solution, the enterprise solution including a plurality of virtual appliances and relationships among the plurality of virtual appliances. Each of the plurality of virtual appliances has one or more virtual machines, and the plurality of virtual appliances are implemented in a physical computing environment. The method includes reconfiguring the plurality of components in response to a change in a configuration of one or more of the plurality of components, wherein at least one method operation is executed through a processor. A computer readable media and a system are provided also.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A virtual appliance manager system and related method offer solutions to the above-described problems. A discovery service, performed by a discovery module in the virtual appliance manager, obtains information about components of virtual appliances of an enterprise solution from virtual machines. The discovery service also obtains information about the relationships among the components of the virtual appliances. This information is passed along to a management service, performed by a management module in the virtual appliance manager. When there is a change in configuration of one or more of the components of the virtual appliances, the management service reconfigures or updates the components. A dashboard module generates a dashboard display, which shows a view of the components and the dependencies among the components, and the health or status of the enterprise solution.

Figure 1:
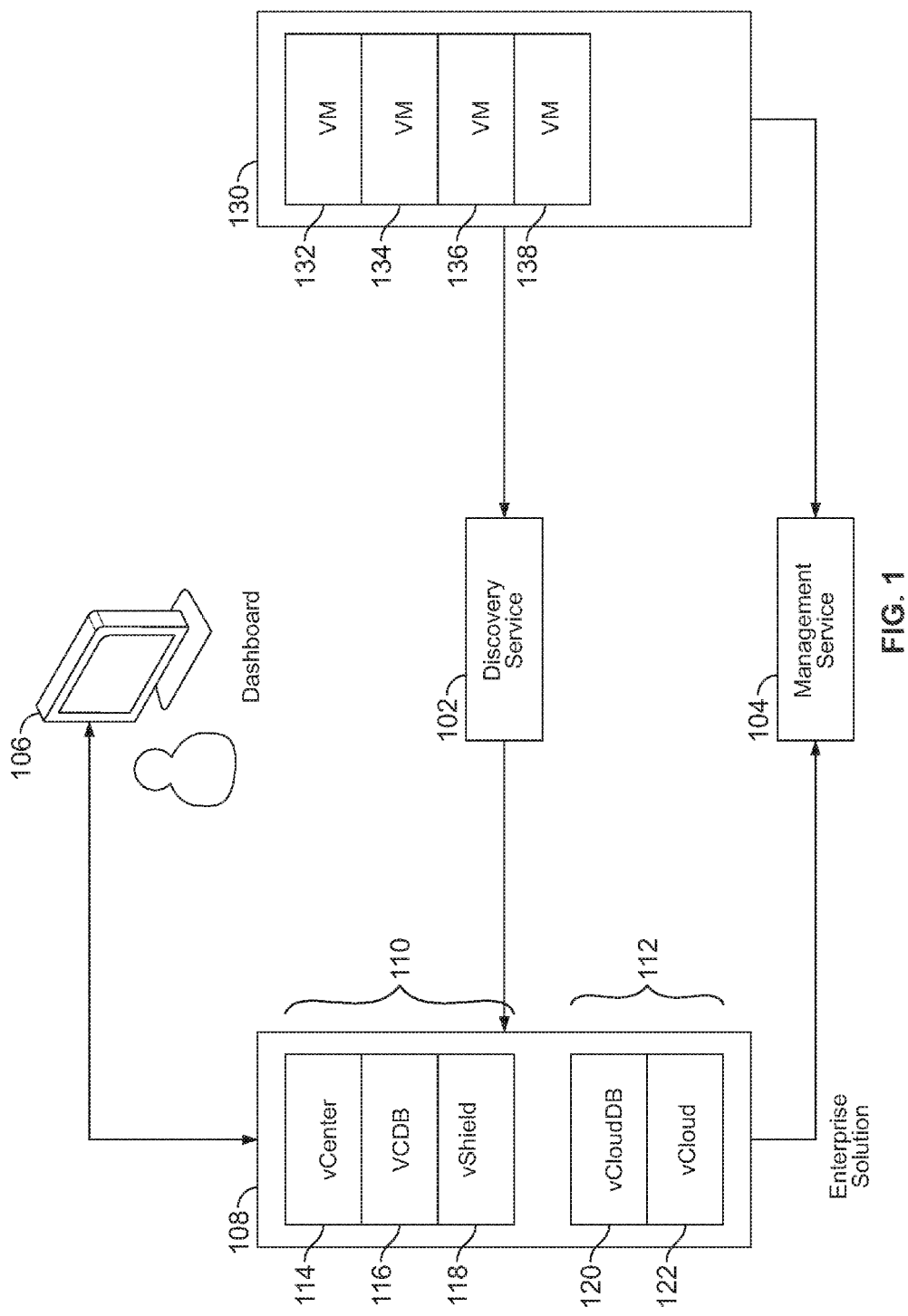
FIG. 1 is a schematic diagram of a virtual appliance manager system, in accordance with some embodiments.

FIG. 1 is a schematic diagram of a virtual appliance manager system, in accordance with an embodiment of the present description. In the example shown, a first virtual appliance 110 and a second virtual appliance 112 are part of an enterprise solution 108. Generally, an enterprise solution 108 will include a specific set of virtual appliances that are combined to suit the needs of an enterprise or organization. Other enterprise solutions could have fewer or additional virtual appliances, and in turn the virtual appliances could have fewer or more virtual machines than shown herein. Continuing with the example, the first virtual appliance 110 has a virtual center (vCenter) 114, which could be performing functions relating to a centralized operation for an enterprise. The first virtual appliance 110 has a virtual center database (VCDB) 116, which could be servicing the virtual center 114 and providing database functions in some embodiments. Also, the first virtual appliance 110 has a virtual shield (vShield) 118, which could be providing security functions for the enterprise and particularly for the virtual center. The second virtual appliance 112 has a virtual cloud (vCloud) director 122, which could be directing cloud services for the enterprise, and a virtual cloud database (vCloudDB) 120, which could be servicing the virtual cloud director 122 and providing database functions using cloud-based memory resources such as network attached storage in a physical infrastructure. The two virtual appliances 110, 112 have various linkages and interdependencies as part of the enterprise solution 108. For example, the virtual center 114, the virtual center database 116, and the virtual shield 118 are interlinked, and the virtual center 114 could also be linked to the virtual cloud director 122. The virtual cloud director 122 is linked to the virtual cloud database 120 in some embodiments. There could be a further linkage between the virtual cloud director 122 and the virtual shield 118, and/or a linkage between the virtual cloud database 120 and the virtual shield 118.

Still referring to FIG. 1, the virtual appliances 110, 112 of the enterprise solution 108 are installed into a virtualized environment 130, using for example virtual machines 132, 134, 136, 138. In further examples, various combinations of virtual appliances and virtual machines can be used in various installations, as depicted by the needs of the organization or enterprise. An illustration of virtualized infrastructure and physical infrastructure is presented with reference to FIG. 4. Essentially, installing a virtual appliance involves loading software into one or more virtual machines. The software is executed on one or more physical computing devices in the physical infrastructure.

Continuing with the example of FIG. 1, a discovery service 102 and a management service 104 are employed in the virtual appliance manager system, for managing the virtual appliances 110, 112. The discovery service 102 discovers all of the components in the system, and their dependencies. The management service 104 reconfigures the components if one or more components are reconfigured or changed, i.e., in response to a change in configuration of a component. A component could include, for example, a virtual appliance or a virtual machine in some embodiments. A display 106 provides a dashboard having a view of all of the components and their dependencies. The dashboard of display 106 may also display the health or status of the enterprise solution 108. Health or status of the enterprise solution 108 could include whether or not linkages are intact, or network connections to a virtual machine or a virtual appliance are intact in some embodiments. The dashboard could also monitor memory levels and usage percentages, throughput or other performance as a percentage of maximum available, and other metrics or parameters as appropriate to the appliances in some embodiments.

There are numerous mechanisms by which the discovery service 102 of FIG. 1 can gather information about the virtual appliances, the virtual machines and the relationships among same. For example, a component can be discoverable. Upon request, the component describes itself and other components upon which the component is dependent. In some embodiments the component could self-describe without needing a request. In some embodiments, an agent in a virtual machine can communicate and cooperate with the discovery service 102 and/or the management service 104. For example, during discovery, the discovery service 102 could pull information from a virtual machine, with cooperation of such an agent. The agent could push the information from the virtual machine, such as on power up or during configuration operations in some embodiments. Information about the components and the linkages or interdependencies could be available in a specified memory location. In embodiments where components are discoverable, the discovery service 102 could discover relationships among the components via communication between the discovery service 102 and the components, as an autonomous action, i.e., without user intervention. In a situation where a virtual machine lacks an agent, or lacks other facilities by which a description of the component and the dependencies could be found or conveyed, manual entry could be employed.

In some embodiments, the discovery service 102 performs component registration. A unique identity is assigned to each component in some embodiments. The identity is unique for each component within an enterprise solution, so that each component can be identified individually. An enterprise solution identifier is assigned to each component, in one embodiment, so that components can be easily grouped. The enterprise solution identifier would be the same for all components in an enterprise solution 108. Component registration could be performed prior to gathering information about the virtual appliances and virtual machines, so that the information is associated with the component identifiers in some embodiments. Component registration, alternatively, could be performed after gathering information about the virtual appliances and virtual machines, so that the component identifiers could be based on this information. In alternative embodiments, the processes could be co-mingled. In some embodiments, a component is remotely configurable. For example, an agent could run on the component and accept commands and configure the component accordingly. As another example, configuration information for a component could be readily accessible in a memory, which the management service 104 could read from or write to.

The following are some examples of the management service 104 reconfiguring or updating components, responsive to a change in a configuration of one of the components. It should be appreciated that reconfiguring or updating components is inclusive of reconfiguring or updating a single component, or several components. Examples of types of changes in the configuration of a component include a change of a host name of a component, a change of a host name of a physical server associated with a virtual appliance, a change of an Internet Protocol address of a component, a loss of a link from one component to another component, a change of a link from one component to another component, etc. A configuration of a component could change, and the management service 104 could then reconfigure another component, or several components. For example, if an Internet Protocol address is changed for one of the components, the management service 104 could propagate that Internet Protocol address change to other components as appropriate. If a host name for a database is changed, the management service 104 could propagate that host name change to virtual machines or appliances that use that database. A link could be changed, or a link could be added as appropriate. The management service 104 can act without user intervention, as an automated, autonomous process in the embodiments described herein. In some embodiments, user intervention, e.g., in the form of user input, can be employed for a more user interactive version.

Figure 2:
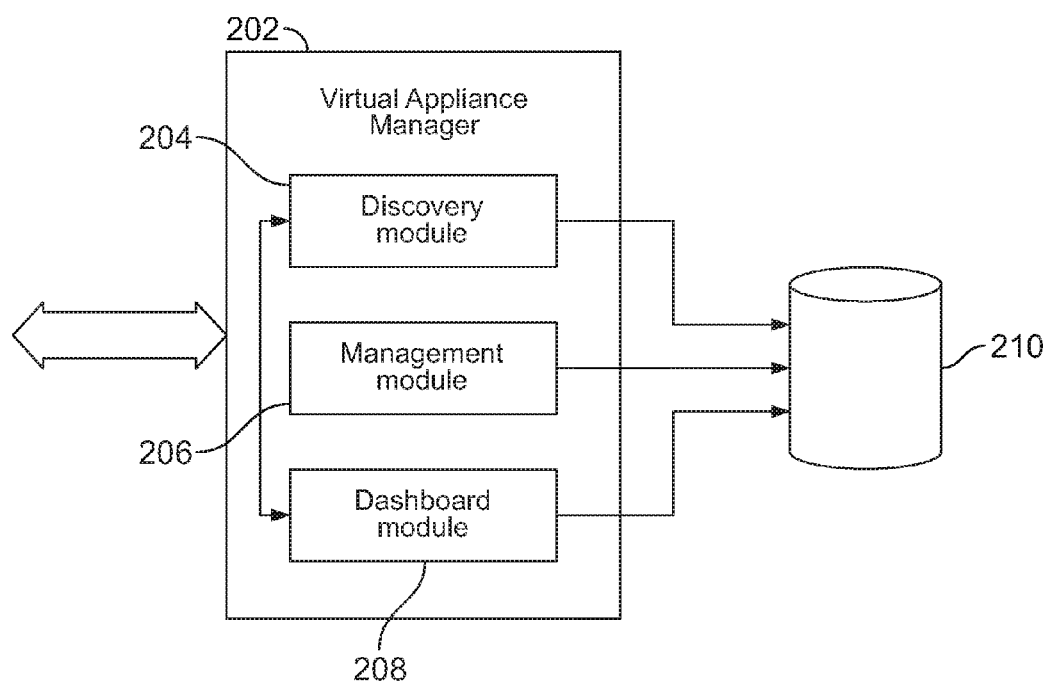
FIG. 2 is a schematic diagram of an embodiment of a virtual appliance manager, based on FIG. 1, in accordance with some embodiments.

FIG. 2 is a schematic diagram of an embodiment of a virtual appliance manager 202, based on FIG. 1. The discovery service 102 of FIG. 1 is implemented in the discovery module 204 of the virtual appliance manager 202, in this embodiment. By querying the components, or otherwise extracting information about the components and the relationships among the components, the discovery service maps the dependencies among the components and builds a representation of the enterprise solution 108 of FIG. 1. The management service 104 of FIG. 1 may be implemented in the management module 206 of the virtual appliance manager 202, in some embodiments. By monitoring the components, or being alerted by the components, the management module 206 detects a change in a configuration of any of the components or in the overall configuration of the enterprise solution. The management module 206 is responsive to such a change, and reconfigures one or more components accordingly, in an autonomous manner.

In some embodiments, the virtual appliance manager 202 also implements a dashboard module 208. These modules communicate amongst one another, and/or can communicate with a database 210. Information about the components can be communicated from the discovery module 204 to the management module 206, either directly, or via the database 210. The dashboard module can obtain information about the configuration and status of the virtual machines, the virtual appliances, and the enterprise solution of FIG. 1 through communication with the discovery module 204, the management module 206, and/or the database 210. In some embodiments, the dashboard module generates a dashboard display, such as described above for the dashboard of FIG. 1.

Figure 3:
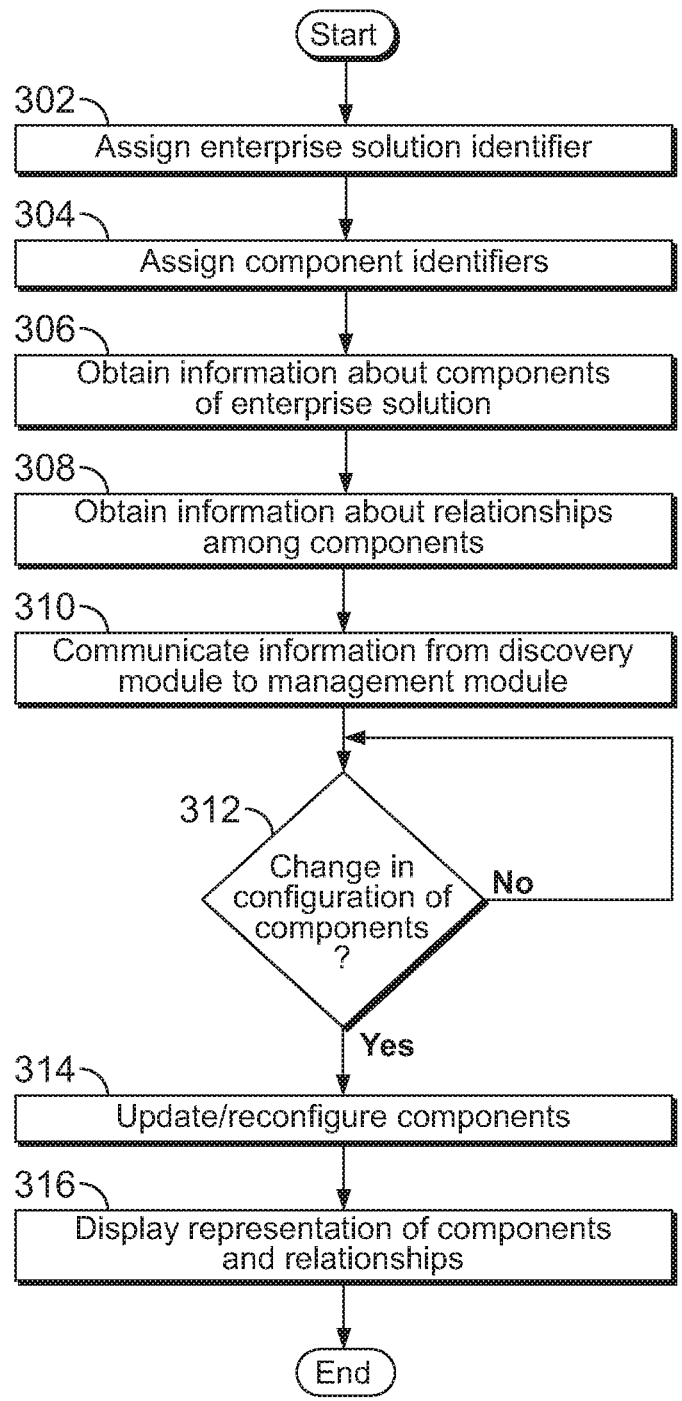
FIG. 3 is a flow diagram of a method of managing virtual appliances, which can be practiced in the virtual appliance manager system of FIG. 1, using the virtual appliance manager of FIG. 2, in accordance with some embodiments.

FIG. 3 is a flow diagram of a method of managing virtual appliances, which can be practiced in the virtual appliance manager system of FIG. 1, using the virtual appliance manager of FIG. 2 in some embodiments. Alternatively, the method could be practiced by a specially programmed computer, i.e., by a processor executing instructions. An enterprise solution identifier is assigned, in an action 302. For example, the enterprise solution identifier may be assigned to components of an enterprise solution, with each component receiving the same enterprise solution identifier. Component identifiers are assigned, in an action 304. For example, each component could receive a different or unique identifier within the enterprise solution. These identifiers could be assigned by the discovery service or the discovery module mentioned above.

Still referring to FIG. 3, information about the components of the enterprise solution is obtained, in an action 306. For example, the discovery service or the discovery module could poll or query components, or pull information from the components, or the components could push information to the discovery service or discovery module. Manual entry could also be used if the information is not otherwise available or accessible. In any of these manners, the discovery service or the discovery module receives the information. Information about the relationships among the components is obtained, in an action 308. For example, the discovery service or the discovery module could apply one or more of the above techniques, or otherwise receive the information as described above with reference to action 306.

Information about the components and relationships is communicated from the discovery module to the management module, in an action 310 of FIG. 3. This communication could be directly from module to module, or could occur through the database to which the discovery module and management module could be connected. In a decision action 312 it is determined if there is a change in the configuration of the components. This could be a change in one component or a change in several components. If there is no change in the configuration of the components, the flow loops back to repeat action 312. In some embodiments, action 312 could be determined on a timed basis, or could be interrupt driven or event driven, etc. If there is a change in the configuration of the components in action 312, the flow continues to the action 314. In the action 314, the components are updated or reconfigured. This could be performed by the management module, which sends or writes a new configuration or propagates a configuration or otherwise configures the component or components in a manner compatible with the recently observed change in configuration. In an action 316, a representation of the components and the relationships are displayed. This could be shown on the dashboard, as controlled by the dashboard module in some embodiments. The display could also include a representation of the health or status of the enterprise solution. Action 316 could be performed at other times during the practicing of the method of FIG. 3.

Figure 4:
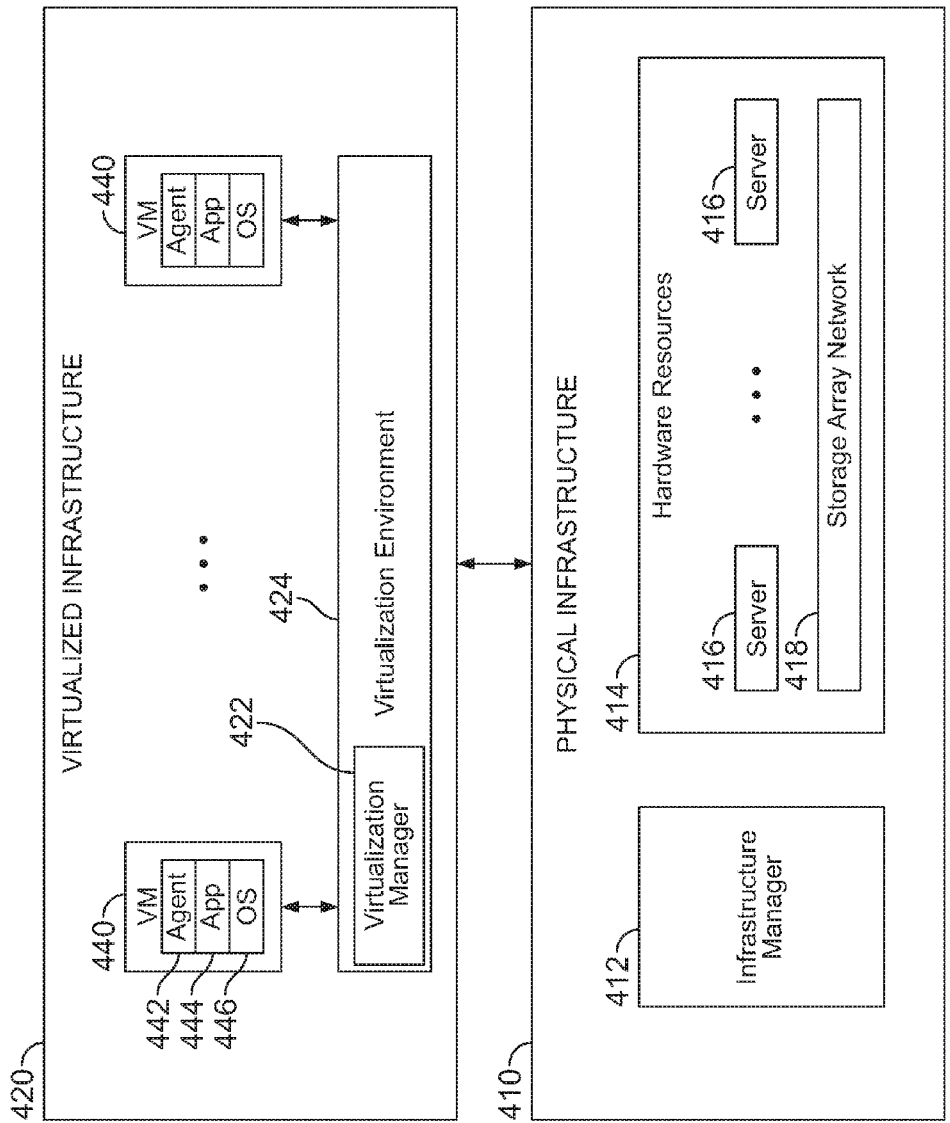
FIG. 4 is a schematic diagram of virtualized infrastructure and physical infrastructure suitable for the virtual appliance manager system of FIG. 1, in accordance with some embodiments.

FIG. 4 is a schematic diagram of virtualized infrastructure and physical infrastructure suitable for the virtual appliance deployment system of FIG. 1. In the physical infrastructure 410, an infrastructure manager 412 interacts with and manages hardware resources 414. The hardware resources 414 include servers 416 and a storage array network 418. The servers 416 and the storage array network 418 are networked. In the virtualized infrastructure 420, virtual machines 440 are implemented in a virtualization environment 424, which is managed by a virtualization manager 422. Each virtual machine 440 may contain some or all of an agent 442, an application 444, and an operating system 446. The virtualized infrastructure 420 can include one or many virtual machines 440, which are physically implemented as modules executing in the hardware resources 414. A virtual appliance, which is being deployed by the virtual appliance deployment system, could take the form of one or more virtual machines 440. The virtual appliance deployment system could take the form of one or more modules executing on one or more of the servers 416, could take the form of a virtual machine 440, or could take the form of a virtual appliance having one or more virtual machines 440. In some embodiments, the physical infrastructure 410 can be implemented with a Vblock™ System available from the VCE Company LLC of Richardson, Tex. The virtualization manager 422 can be implemented with the VMware vCenter virtualized management platform available from VMware, Inc., of Palo Alto, Calif. in some embodiments. A virtualized environment can be implemented in the virtualization environment 424 using VMware vSphere or VMware ESX-based hypervisor technologies on servers in some embodiments. In some embodiments, hardware resources 414 may be clustered and in other embodiments, virtualized clusters may exist in virtualization environment 424. It should be appreciated that the embodiments described herein may be extended to any virtualized environment/hypervisor and are not limited to a VMware ESX-based hypervisor in this example. It should be further appreciated that a module as used herein may be software, firmware, hardware, or any combination of the three.

Figure 5:
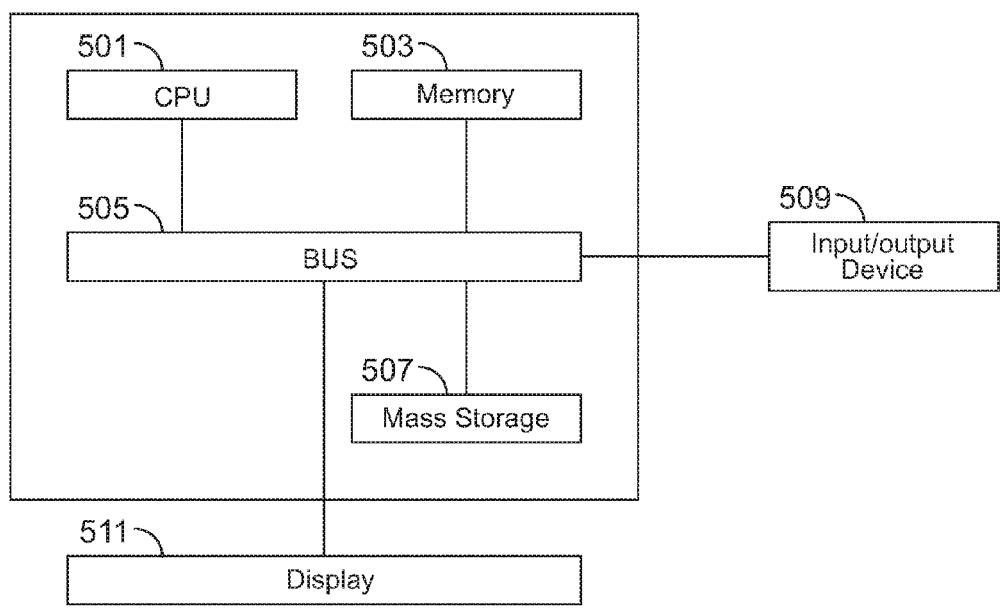
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for managing virtual appliances in accordance with some embodiments. The computing device includes a central processing unit (CPU) 501, which is coupled through a bus 505 to a memory 503, and mass storage device 507. Mass storage device 507 represents a persistent data storage device such as a disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS-WINDOWS™, UNIX™, LINUX™, iOS™, CentOS™, Android™, Redhat Linux™, z/OS™, EMC ISILON ONEFS™, DATA ONTAP™ or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a non-transitory, tangible, computer readable media. The computer readable media is any data storage device that can store data, which can be thereafter read by a computer system. Examples of the computer readable media include hard drives, network attached storage (NAS), read-only memory, random-access memory, DVD, CD-ROMs, CD-Rs, CD-RWs, magnetic tapes, flash, and other optical and non-optical data storage devices. The computer readable media can also be distributed over a network coupled computer system so that the computer readable code is stored and executed in a distributed fashion. Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for managing virtual appliances, comprising:
    discovering information about each of a plurality of virtual appliances of an enterprise solution;
    discovering information about relationships among each of the plurality of virtual appliances, wherein each of the plurality of virtual appliances is implemented on one or more virtual machines, wherein each of the plurality of virtual machines is implemented in a more dependencies among each of the plurality of virtual appliances, wherein each virtual appliance of the plurality of virtual appliances communicates an indication of all virtual appliances upon which the virtual appliance depends to all other virtual appliances of the plurality of virtual appliances; and
    reconfiguring at least one of the plurality of virtual appliances in response to a change in a configuration of at least another one of the plurality of virtual appliances, wherein at least one method operation is executed through a processor.

2. The method of claim 1, further comprising:
    assigning a same enterprise solution identifier to each of the plurality of virtual appliances; and
    assigning a virtual appliance identifier to each of the plurality of virtual appliances, the virtual appliance identifier unique within the enterprise solution for each virtual appliances of the plurality of virtual appliances.

3. The method of claim 1, further comprising:
each of the plurality of virtual appliances communicating a self-description.

4. The method of claim 1, further comprising:
polling each of the plurality of virtual appliances for a self-description and dependencies on virtual appliances of the plurality of virtual appliances; and
receiving from each of the plurality of virtual appliances the self-description and the dependencies on others of the plurality of virtual appliances.

5. The method of claim 1, further comprising:
receiving a manual entry of a description of one of the plurality of virtual appliances and dependencies of the one of the plurality of virtual appliances on virtual appliances of the plurality of virtual appliances.

6. The method of claim 1, further comprising:
discovering relationships among the plurality of virtual appliances, via communication between a discovery module and the plurality of virtual appliances, as an autonomous action.

7. The method of claim 1, wherein reconfiguring the plurality of virtual appliances occurs via communication between a management module and at least one of the plurality of virtual appliances, as an autonomous action.

8. A non-transitory, tangible, computer-readable media having thereupon instructions which, when executed by a processor, cause the processor to perform a method comprising:
discovering information about each of a plurality of virtual appliances of an enterprise solution;
discovering information about relationships among each of the plurality of virtual appliances, wherein the discovering comprises mapping one or more dependencies among each of the plurality of virtual appliances, wherein each virtual appliance of the plurality of virtual appliances communicates an indication of all virtual appliances upon which the virtual appliance depends to all other virtual appliances of the plurality of virtual appliances;
determining a change in the configuration of at least one of the plurality of virtual appliances, based on the information about each of the plurality of virtual appliances of the enterprise solution and the information about the relationships among the plurality of virtual appliances; and
changing a configuration of at least one other of the plurality virtual appliances, responsive to the change in the configuration of the at least one of the plurality of virtual appliances.

9. The computer-readable media of claim 8, wherein discovering the information about each of a plurality of virtual appliances and discovering the information about relationships among each of the plurality of virtual appliances is a result of one from a group consisting of:
querying one of the plurality of virtual appliances;
pulling the information from the one of the plurality of virtual appliances;
the one of the plurality of virtual appliances pushing the information; and
a manual entry of the information.

10. The computer-readable media of claim 8, wherein changing the configuration includes one from a group consisting of: changing a host name, changing a link, adding a link, and changing an Internet Protocol address.

11. The computer-readable media of claim 8, wherein the change in the configuration includes one from a group consisting of: a change of a host name of a virtual appliance, a change of a host name of a physical server associated with a virtual appliance, a change of an Internet Protocol address of a virtual appliance, a loss of a link from one virtual appliance to another virtual appliance, and a change of a link from one virtual appliance to another virtual appliance.

12. The computer-readable media of claim 8, wherein the change in the configuration is communicated via a database.

13. The computer-readable media of claim 8, further comprising:
displaying a representation of the plurality of a virtual appliances and the relationships among the plurality of virtual appliances.

14. A virtual appliance manager system, comprising:
a computing device, having therein a discovery module and a management module;
the discovery module operable to discover information about each of a plurality virtual appliances of an enterprise solution;
the discovery module further operable to discover information about relationships among each of the plurality of virtual appliances of the enterprise solution, wherein discovering comprises mapping one or more dependencies among each of the plurality of virtual appliances, wherein each virtual appliance of the plurality of virtual appliances communicates an indication of all virtual appliances upon which the virtual appliance depends to all other virtual appliances of the plurality of virtual appliances; and
the management module operable to reconfigure at least one of the plurality of virtual appliances in response to a change in a configuration of at least another one of the plurality of virtual appliances.

15. The virtual appliance manager system of claim 14, further comprising:
at least one of the virtual appliances having an agent installed therein, the agent operable to describe the at least one of the virtual appliances to the discovery module, the agent operable to indicate to the discovery module which of the virtual appliances of the enterprise solution upon which the at least one of the virtual appliances depends.

16. The virtual appliance manager system of claim 14, further comprising:
each of the virtual appliances being remotely configurable.

17. The virtual appliance manager system of claim 14, further comprising:
the discovery module connectable to a database;
the discovery module operable to write descriptions of the virtual appliances and descriptions of the dependencies among the virtual appliances to the database;
the management module connectable to the database; and
the management module operable to access the descriptions of the virtual appliances and the descriptions of the dependencies among the virtual appliances, in the database, in order to update the virtual appliances.

18. The virtual appliance manager system of claim 14, wherein the discovery module is operable to extract information, regarding the dependencies among the virtual appliances, from the virtual appliances.

19. The virtual appliance manager system of claim 14, further comprising:
the computing device having therein a dashboard module, the dashboard module operable to generate a display of the virtual appliances and the dependencies among the virtual appliances, the dashboard module further operable to generate a display of a health of the enterprise solution.

20. The virtual appliance manager system of claim 14, further comprising:
   the management module operable to reconfigure the virtual appliances as an autonomous action.

\* \* \* \* \*